United States Patent [19]

Quinby

[11] 4,231,507

[45] Nov. 4, 1980

[54] HIGH-TEMPERATURE, HIGH-PRESSURE BONDING OF NESTED TUBULAR METALLIC COMPONENTS

[75] Inventor: Thomas C. Quinby, Kingston, Tenn.

[73] Assignee: The United States of America as represented by the United States Department of Energy, Washington, D.C.

[21] Appl. No.: 2,140

[22] Filed: Jan. 9, 1979

[51] Int. Cl.³ .............................................. B23K 20/14
[52] U.S. Cl. ................................... 228/131; 156/294; 228/44.1 R; 228/193; 228/243; 269/48.1
[58] Field of Search ................ 228/44.1 R, 49 B, 126, 228/127, 131, 193, 243; 269/48.1; 156/294

[56] References Cited

U.S. PATENT DOCUMENTS

| | | | |
|---|---|---|---|
| 2,226,078 | 12/1940 | Spann | 269/48.1 X |
| 2,424,878 | 7/1947 | Crook | 269/48.1 X |
| 2,850,798 | 9/1958 | Bowman et al. | 228/193 |
| 3,372,464 | 3/1968 | Vincent et al. | 228/124 |
| 3,481,024 | 12/1969 | Bunn | 228/127 |
| 3,550,254 | 12/1970 | Greenspan et al. | 228/193 |
| 3,559,274 | 2/1971 | Granata | 29/447 |
| 3,703,032 | 11/1972 | Batista | 228/193 |
| 3,762,032 | 10/1973 | Bowling et al. | 228/127 |
| 3,955,093 | 5/1976 | Quinby | 250/493 |

FOREIGN PATENT DOCUMENTS

1379684 10/1964 France ..................................... 228/121

*Primary Examiner*—Francis S. Husar
*Assistant Examiner*—Kenneth J. Ramsey

*Attorney, Agent, or Firm*—James E. Denny; Stephen D. Hamel; Fred O. Lewis

[57] ABSTRACT

This invention is a tool for effecting high-temperature, high-compression bonding between the confronting faces of nested, tubular, metallic components. In a typical application, the tool is used to produce tubular target assemblies for irradiation in nuclear reactors or particle accelerators, the target assembly comprising a uranium foil and an aluminum-alloy substrate. The tool preferably is composed throughout of graphite. It comprises a tubular restraining member in which a mechanically expandable tubular core is mounted to form an annulus with the member. The components to be bonded are mounted in nested relation in the annulus. The expandable core is formed of individually movable, axially elongated segments whose outer faces cooperatively define a cylindrical pressing surface and whose inner faces cooperatively define two opposed, inwardly tapered, axial bores. Tapered rams extend respectively into the bores. The loaded tool is mounted in a conventional hot-press provided with evacuation means, heaters for maintaining its interior at bonding temperature, and hydraulic cylinders for maintaining a selected inwardly directed pressure on the tapered rams. With the hot-press evacuated and the loaded tool at the desired temperature, the cylinders are actuated to apply the selected pressure to the rams. The rams in turn expand the segmented core to maintain the nested components in compression against the restraining member. These conditions are maintained until the confronting faces of the nested components are joined in a continuous, uniform bond characterized by high thermal conductivity.

4 Claims, 3 Drawing Figures

HIGH-TEMPERATURE, HIGH-PRESSURE BONDING OF NESTED TUBULAR METALLIC COMPONENTS

BACKGROUND OF THE INVENTION

This invention relates generally to methods and apparatus for the high-temperature, high-pressure bonding of a plurality of nested tubular components to form a unitary assembly thereof. More particularly, it relates to a tool which under such conditions produces a continuous, uniform bond between confronting surfaces of such components. The invention also relates to a method for bonding such components.

A well-known technique for the production of certain radioisotopes and fission products comprises subjecting a cooled metallic target to irradiation from a nuclear reactor or a particle accelerator. Often, the target is in the form of a flat sandwich comprising a thin metal foil diffusion-bonded to a relatively thick substrate composed of a dissimilar metal. The substrate provides physical support for the foil and conducts irradiation-induced heat from the foil to a suitable cooling medium, such as circulated water or gaseous helium.

In some target applications, a tubular target is preferred. For example, in the production of certain fission products, the target comprises a thin, tubular uranium foil nested within and bonded to a thicker tubular aluminum-alloy substrate. Hitherto, the preferred technique for forming tubular targets has comprised superimposing flat sheets of the foil and substrate materials, rolling the superimposed sheets to form a tube having two abutting edges, and welding these edges to form a leak-tight seam. Unfortunately, that method is relatively complex and does not provide as uniform a target as is desired. Furthermore, complete dissolution of both the target and the substrate is necessary for satisfactory recovery of the desired radioisotopes or fission products. Tubular targets also have been formed by isostatic processing, but that method requires large equipment and very high pressures.

OBJECTS OF THE INVENTION

Accordingly, it is an object of this invention to provide a novel tool and method for bonding nested tubular metallic components into a unitary tubular assembly under conditions of elevated temperature and pressure.

It is another object to provide a tool for joining confronting surfaces of such members by means of a bond which is continuous, highly uniform, and characterized by high termal conductivity.

It is another object to provide a diffusion-bonding tool for forming a highly uniform and seamless tubular metallic composite.

It is another object to provide a diffusion-bonding tool having a radially expandable segmented core mounted within an annular restraining member, whereby nested tubular components positioned between the core and restraining member are diffusion-bonded one to the other by expansion of the core while the tool and the components are maintained at bonding temperature.

SUMMARY OF THE INVENTION

One form of the invention may be summarized as follows: A tool for use in the high-temperature, high-pressure bonding of a plurality of nested tubular metallic components to form a unitary tubular assembly thereof, said tool comprising: a tubular restraining member having an axis; a mechanically expandable tubular core mounted coaxially within said restraining member, said core being formed of a plurality of axially elongated, radially displaceable segments having curved outer faces which cooperatively define an annular-pressing surface which with said restraining member defines an annulus for accommodating said nested components, said segments having curved inner faces cooperatively defining two opposed and inwardly tapering axial bores; and tapered rams of circular cross section respectively fitted in said bores and movable inwardly therein to urge said segments radially outward to compress said nested components against said restraining member.

Figure 1:
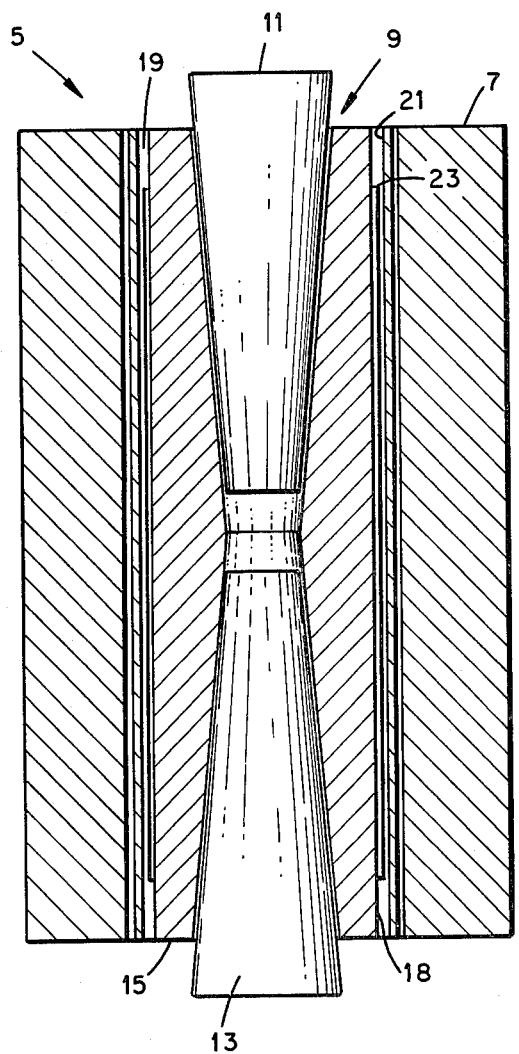
FIG. 1 is a side view, partly in section, of a bonding tool designed in accordnce with this invention, a pair of nested tubular components being shown positioned in a bonding chamber of the tool.

The drawings are not to scale. For clarity, exaggerated clearances are shown between various components.

DESCRIPTION OF THE PREFERRED EMBODIMENT

The tool disclosed herein is generally applicable to the high-temperature, high-pressure bonding of two nested tubular components composed of metallic materials—i.e., metals and alloys. For example, it is applicable to the diffusion-bonding of components composed of like metals or of dissimilar metals (in the latter case, the resulting diffusion bond will be an intermetallic phase). For brevity, the invention will be illustrated below chiefly as designed and used for the fabrication of tubular targets comprising a thin uranium foil bonded to a thicker aluminum substrate.

Referring to the figures, the tool 5 preferably comprises an all-graphite assembly which includes a relatively massive annular restraining member 7, a radially expandable tubular core 9 coaxially mounted therein, and a pair of rams 11 and 13 extending into and slidably fitted in the core. the core is formed of a plurality of abutting axially elongated segments. (For clarity, considerable clearance is shown between the segments in FIG. 2.) In the illustrated embodiment, the core comprises four identical segments 15, each having the shape shown in FIG. 3. The curved outer faces 17 of the segments cooperatively define the surface 18 of a cylinder, this surface being coaxial with the inner wall of the restraining member 7 and defining therewith an annulus 19 for reception of two nested tubular components 21, 23 to be bonded.

Figure 3:
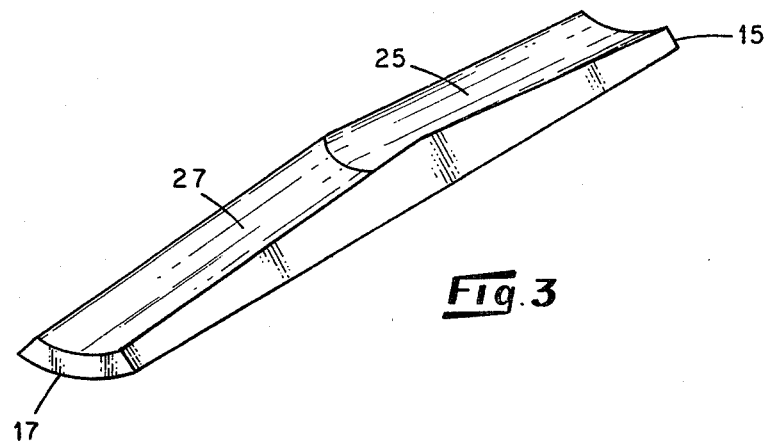
FIG. 3 is a perspective view of a typical elongated segment of an expandable segmented core designated as 9 in FIG. 1.
Figure 2:
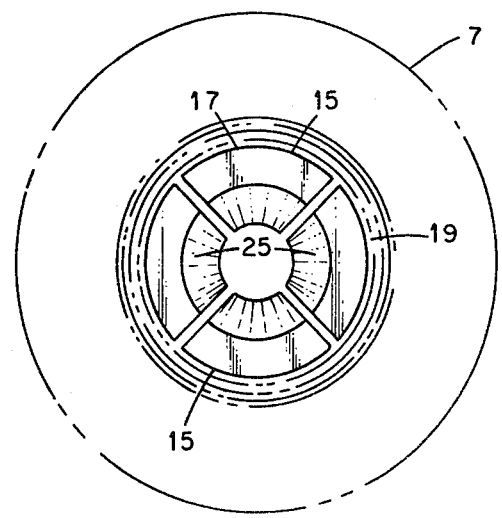
FIG. 2 is a top view of the tool with two rams 11 and 13 (FIG. 1) removed.

As shown in FIG. 3, the wall thickness of the typical segment 15 increases gradually from a minimum value at either of its ends to a maximum value at its midplane. The inside face of the segment comprises two axially extending channels 25, 27 of uniform depth which extend respectively from the ends of the segment to its midplane. As indicated in FIGS. 1 and 2, the confronting channels of the assembled segments 15 cooperatively define two opposed, inwardly tapered, axial bores for respectively receiving the rams 11, 13. When a suitable force is applied to the outer end faces of the rams, they urge the segments 15 radially outward, compressing the nested components 21, 23 against the restraining member 7. The entire tool 5 is composed of rigid material having a melting point above the bonding temperature for the components 21, 23, so that the tool and the nested-components may be maintained at bonding temperature while a force sufficient to effect bonding is applied to the rams.

EXAMPLE

A tool of the kind shown in the figures was used to form tubular targets for the production of $^{99}$Mo and $^{131}$Xe in a nuclear reactor. As designed to this application, the tool 5 was composed throughout of graphite (Type ATJ, manufactured by Union Carbide Corporation). The tubular core as assembled had a length of 8 inches and an outside diameter of 1.300 inches. The rams 11, 13 had a length of 4 inches (as measured along the sidewall) and a taper of 2.25 inches per foot. The core consisted of four identical segments 15, each having a maximum wall thickness of 0.400 inch. Each of the bores defined by the segments had a taper of 2.250 inches per foot. The restraining member 7 had a length of 8 inches and a wall thickness of 2 inches. Referring to the assembled tool, the annulus 19 for accommodating the nested components 21, 23 was approximately 0.005 inch wide.

Before insertion of the core 15 in the restraining member 7, a sheet of substrate material was hand-fitted in the bore of member 7 so as to form a tube positioned flush against the entire inside wall thereof, the confronting edges of the sheet being in abutting relation. In this instance, the substrate was 1/32 inch-thick 2024-T4 aluminum. The foil component, a 7 inch by 4.08 inch sheet of 0.005 inch-thick uranium, was similarly positioned flush against the substrate. The core 15 then was positioned in the restraining member, after which the rams were partially inserted by hand so as to bear on the segments and urge them radially outward, compressing the foil and substrate against member 7.

The loaded tool assembly was inserted in a conventional electrically heated hot-press provided with means for evacuating the same to very low pressures and with opposed hydraulic cylinders for maintaining identical bonding pressures on the outer faces of the rams 11, 13 during hot-pressing. Bonding of the foil and substrate was accomplished by maintaining the tool assembly at 500° C. in the inert atmosphere for 60 minutes, during which period a static pressure of 4000 psi was maintained on the rams. Following this operation, the bonded composite, or target, was removed from the tool and examined visually. (No difficulty was encountered in separating the composite from the surfaces of the core and restraining member.) The foil was free from wrinkles or cracks. Examination of this and similar targets established that the confronting surfaces of the foil and substrate were everywhere bonded by a highly uniform intermetallic phase. The examinations included photomicrography and scanning electron microscopy. The face-to-face thermal conductivity of the target was determined to be adequate for the intended use in nuclear reactors. Thermal-cycling tests caused no separation of the bonded faces. The same tool was used in a similar manner to produce satisfactory uranium/aluminum-alloy targets in which the uranium foils had thicknesses ranging from 0.001 inch to 0.015 inch. In these instances, the foil was bonded to the interior of the aluminum-alloy substrate; if desired, however, the initial positions of the foil and substrate may be reversed from those shown in FIG. 1, so that the foil is bonded to the outside of the substrate.

Use of the tool described herein provides several advantages over the previous target-forming techniques mentioned above. These advantages include the following: a significant reduction in the number of process operations and the length of time required to produce acceptable targets; elimination of target welds, which are objectionable because they preclude close dimensional tolerances; production of bonds of higher thermal conductivity; and simplification of subsequent chemical processing of the target, since only the target need be dissolved—not the substrate.

It will be apparent that the tool described above may be composed of various materials which have melting points above those of the target components to be bonded and which are not reactive with the above-mentioned foil or substrate. For instance, in the foregoing Example (uranium foil, aluminum-alloy substrate), the tool could have been composed throughout of densified aluminum oxide or of Stellite. As another example, in an application where both of the target components are composed of copper, the tool may be composed of tungsten carbide or a suitable non-metallic refractory material, such as fused alumina (e.g., Alundum). If necessary, stopoff compounds or shims may be employed to restrict bonding of the target components to adjacent surfaces of the tool. It will also be apparent that the tool may be used to bond more than two tubular components. For example, in some applications it may be desirable to position a relatively thin interleaf material, such as a eutectic former, between two components to be bonded.

The bonding parameters and specific dimensions cited in the foregoing Example are for illustrative purposes only and are not necessarily the optimum. Suitable bonding parameters—i.e., coordinated time, temperature, and pressure conditions—for various diffusion-bondable components may be readily determined by those versed in the art. The selection of a suitable non-reactive atmosphere also is well within the skill of the art. (A suitable nonreactive atmosphere may be provided by evacuating the hot-press to low pressures or charging the same with an inert gas, such as argon.) Given the teachings herein, it is well within the skill of the art to determine suitable tool dimensions for the various tubular components. The scope of this invention is to be determined by reference to the appended claims.

I claim:

1. A graphite tool for use in diffusion-bonding a plurality of nested tubular metallic components to form a unitary tubular assembly thereof, said tool comprising:
   a tubular restraining member having an axis,
   a tubular core coaxially mounted within said member and defining therewith an annulus for reception of said nested components, said core being formed of a plurality of axially elongated segments each displaceable outwardly away from said axis, said segments having confronting curved inner faces cooperatively defining opposed, inwardly tapering, axially extending bores which extend respectively from the ends of said core to the transverse midplane thereof, and independently movable, solid, tapered rams respectively extending into said bores and movable inwardly therein to the region of said midplane to be in contact with and exert radially directed force on at least most of the interior surface of said core and compress the received nested components against said member.

2. A graphite tool for use in the high-temperature, high-pressure bonding of a plurality of nested tubular metallic components to form a unitary tubular assembly thereof, said tool comprising:

a tubular restraining member having an axis;

a mechanically expandable tubular core mounted coaxially within said restraining member, said core being formed of a plurality of axially elongated, radially displaceable segments having curved outer faces which cooperatively define a cylindrical pressing surface which with said restraining member defines an annulus for accommodating said nested components, said segments having curved inner faces cooperatively defining two opposed and inwardly tapering axial bores which extend respectively from the ends of said core to the transverse midplane thereof; and solid, independently movable, tapered rams of circular cross section respectively fitted in said bores and movable inwardly therein to positions adjacent said midplane to contact most of the interior surface of said core and urge said segments radially outward to compress uniformly said nested components against said restraining member.

3. The method of bonding a metallic foil to a metallic substrate to form a unitary tubular assembly thereof, said method comprising:

providing a bonding tool comprising a graphite tubular restraining member; a mechanically expandable graphite core coaxially mounted in said member, said core being formed of axially elongated and individually radially displaceable segments having curved outer faces which cooperatively define a cylindrical pressing surface which with said member defines an annulus, said segments having curved inner faces which cooperatively define two opposed and inwardly tapering axial bores; and independently movable, solid, tapered graphite rams respectively extending into said bores and movable inwardly therein to positions adjacent said midplane to urge said segments and pressing surface toward said member;

positioning said foil and substrate in nested relation in said annulus, each of the members so positioned being in the form of a tube having a pair of abutting edges;

maintaining the resulting loaded tool in a non-reactive atmosphere and at an elevated temperature promoting bonding of said foil and substrate; and while the loaded tool is so maintained, maintaining a selected inwardly directed force on each of said rams to exert radially directed force on most of the interior surface of said core and compress said foil and substrate against said restraining member to effect uniform bonding of the confronting faces of said foil and substrate.

4. The method of claim 3 wherein said foil is uranium and said substrate is aluminum alloy.

* * * * *